(12) United States Patent
Doran et al.

(10) Patent No.: US 7,352,970 B2
(45) Date of Patent: *Apr. 1, 2008

(54) DISPERSION MANAGEMENT SYSTEM FOR SOLITON OPTICAL TRANSMISSION SYSTEM

(75) Inventors: Nicholas John Doran, Stratford-upon-avon (GB); Nicholas John Smith, Canterbury (GB)

(73) Assignee: BTG International Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/083,966

(22) Filed: May 26, 1998

(65) Prior Publication Data

US 2002/0076183 A1 Jun. 20, 2002

Related U.S. Application Data

(63) Continuation of application No. PCT/GB96/02923, filed on Nov. 27, 1996.

(30) Foreign Application Priority Data

Nov. 27, 1995 (GB) .................................. 9524203.8

(51) Int. Cl.
*H04B 10/12* (2006.01)

(52) U.S. Cl. ...................... 398/147; 398/148; 398/158; 398/159; 398/79; 398/81; 385/24; 385/123; 385/124; 385/127; 385/15

(58) Field of Classification Search ................ 359/161, 359/173, 179, 188, 195; 398/80–81, 141, 398/146–150, 200, 214, 159, 158, 79; 385/122, 385/24, 15, 123, 124, 127

See application file for complete search history.

(56) References Cited

U.S. PATENT DOCUMENTS

| 4,778,237 A | 10/1988 | Sorin et al. ............. 350/96.15 |
| 5,035,481 A | 7/1991 | Mollenauer |
| 5,218,662 A * | 6/1993 | Dugan ....................... 385/123 |
| 5,224,183 A | 6/1993 | Dugan |

(Continued)

FOREIGN PATENT DOCUMENTS

EP 0 609 129 A 8/1994

(Continued)

OTHER PUBLICATIONS

Haus et al., "Stretched-Pulse Additive Pulse Mode-Locking in Fiber Ring Lasers: Theory and Experiment", IEEE Juornal of Quantum Electronics, vol. 31, No. 3, Mar. 1995. pp. 591-598.*

(Continued)

*Primary Examiner*—Hanh Phan

(57) ABSTRACT

A dispersion management system for soliton or soliton-like transmission systems comprises a length of optical fiber (L) in which a plurality of sections (I) made up of components (N,A) of opposite sign dispersions are concatenated together. The duration of the dispersion compensation phase is short in comparison with the propagation interval in the remainder of the system and that the path average dispersion is anomalous.

14 Claims, 4 Drawing Sheets

U.S. PATENT DOCUMENTS

| | | | | |
|---|---|---|---|---|
| 5,343,322 | A * | 8/1994 | Pirio et al. | 359/173 |
| 5,471,333 | A * | 11/1995 | Taga et al. | 359/173 |
| 5,488,620 | A | 1/1996 | Minden | 372/18 |
| 5,508,845 | A | 4/1996 | Frisken | 359/161 |
| 5,513,194 | A | 4/1996 | Tamura et al. | 372/6 |
| 5,532,861 | A | 7/1996 | Pirio et al. | |
| 5,557,441 | A * | 9/1996 | Mollenauer | 398/146 |
| 5,559,910 | A | 9/1996 | Taga et al. | 359/173 |
| 5,574,590 | A | 11/1996 | Edagawa et al. | 359/179 |
| 5,577,057 | A | 11/1996 | Frisken | 37/18 |
| 5,606,445 | A * | 2/1997 | Kikuchi et al. | 398/147 |
| 5,612,808 | A * | 3/1997 | Audouin et al. | 359/161 |
| 5,629,795 | A | 5/1997 | Suzuki et al. | 359/337 |
| 5,680,491 | A * | 10/1997 | Shigematsu et al. | 359/161 |
| 5,717,510 | A * | 2/1998 | Ishikawa et al. | 398/199 |
| 5,764,841 | A | 6/1998 | Iwatsuki et al. | 385/123 |
| 5,798,853 | A | 8/1998 | Watanabe | 359/160 |
| 5,828,478 | A | 10/1998 | Thomine et al. | 359/181 |
| 5,887,105 | A | 3/1999 | Bhagavatula et al. | |
| 5,898,716 | A | 4/1999 | Ahn et al. | 372/6 |
| 5,905,825 | A * | 5/1999 | Brindel et al. | 359/161 |
| 5,966,228 | A | 10/1999 | Akiba et al. | |
| 6,005,702 | A | 12/1999 | Suzuki et al. | |
| 6,097,524 | A | 8/2000 | Doran et al. | 359/179 |
| 6,122,088 | A | 9/2000 | Hasegawa | 359/188 |
| 6,137,604 | A | 10/2000 | Bergano | 359/161 |
| H1926 | H * | 12/2000 | Carruthers et al. | 372/6 |
| 6,215,929 | B1 | 4/2001 | Byron | |
| 6,243,181 | B1 * | 6/2001 | Golovchenko et al. | 359/161 |
| 6,307,985 | B1 | 10/2001 | Murakami et al. | |
| 6,321,015 | B1 | 11/2001 | Doran et al. | 385/123 |
| 6,433,923 | B2 | 8/2002 | Tanaka et al. | |
| 6,442,320 | B1 | 8/2002 | Danziger et al. | |
| 6,473,550 | B1 | 10/2002 | Onishi et al. | |
| 6,487,005 | B2 * | 11/2002 | Georges et al. | 359/337.5 |
| 6,650,452 | B1 * | 11/2003 | Doran et al. | 398/147 |
| 6,680,787 | B1 | 1/2004 | Doran et al. | |
| 6,701,050 | B1 * | 3/2004 | Chertkov et al. | 385/123 |
| 6,738,542 | B1 | 5/2004 | Doran et al. | |
| 2002/0076183 | A1 | 6/2002 | Doran et al. | |
| 2003/0185574 | A1 * | 10/2003 | Inada | 398/147 |
| 2004/0076373 | A1 * | 4/2004 | Blow et al. | 385/27 |

FOREIGN PATENT DOCUMENTS

| | | | |
|---|---|---|---|
| EP | 0 500 357 B1 | 8/1995 | |
| EP | 0 777 347 A2 | 6/1997 | |
| EP | 0 531 210 B1 | 3/1998 | |
| EP | 0 777 347 A3 | 4/1998 | |
| EP | 0 846 977 A2 | 6/1998 | |
| EP | 1 000 474 B1 | 5/2004 | |
| GB | 2 268 018 A | 12/1993 | |
| GB | 2 271 236 A | 4/1994 | |
| GB | 2 277 651 | 11/1994 | |
| GB | 002277651 A * | 11/1994 | 359/161 |
| GB | 2 279 838 | 1/1995 | |
| JP | 2-96120 | 4/1990 | |
| JP | 3-214123 | 9/1991 | |
| JP | 04-304432 | 10/1992 | |
| JP | 4-335619 | 11/1992 | |
| JP | 05-152645 | 6/1993 | |
| JP | 6-018943 | 1/1994 | |
| JP | 6-110094 | 4/1994 | |
| JP | 6-258675 | 9/1994 | |
| JP | 7-183848 | 7/1995 | |
| JP | 8-146472 | 6/1996 | |
| JP | 8-286219 | 11/1996 | |
| JP | 9-162805 | 6/1997 | |
| JP | 11-512536 | 10/1999 | |
| WO | WO 85/00483 A1 | 1/1985 | |
| WO | WO 97/20403 | 6/1997 | |
| WO | WO 98/36512 | 8/1998 | |
| WO | WO 99/07088 | 2/1999 | |

OTHER PUBLICATIONS

Electronics Letters, vol. 31, No. 3, Feb. 2, 1995, p. 216/217 XP000504221 Nakazawa M et al: "Optical Soliton Communication in a Positively and Negatively Dispersion-Allocated Optical Fibre Transmission Line" see p. 216, right-hand column, last paragraph—p. 217, left-hand column, paragraph 3; figures 1,2.

Journal of Lightwave Technology, vol. 12, No. 8, Aug. 1, 1994, pp. 1330-1337, XP000484306 Forysiak W et al: "Stepwise Dispersion Profiling of Periodically Amplified Soliton Systems" see p. 1335, left-hand column, paragraph 2.

Patent Abstracts of Japan vol. 014, No. 301 (P-1069), Jun. 28, 1990 & JP 02 096120 A (Nippon Telegr & Teleph Corp), Apr. 6, 1990, see abstract.

Zhang et al., *Optical Soliton Propagation in a Positively and Negatively Dispersion Allocated Fiber*, Communication Technology Proceedings, ICCT1, 1996, pp. 319-322.

Suzuki et al., *Reduction of Gordon-Haus Timing Jitter by Dispersion Compensation in Soliton Transmission*, Electronic Letters 31, 1995, pp. 1-7 and Figures 1-3.

Kawai et al., *10 Gbit/s Optical Soliton Transmission Over 7200 km by Using a Monolithically Integrated MQW-DFB-LD/MQW-EA Modulator Light Source*, Electronic Letters, vol. 30, No. 3, Feb. 3, 1994, pp. 251-252.

Chen et al., *Soliton Fiber Ring Laser*, Optics Letters, vol. 17, No. 6, Mar. 15, 1992, pp. 417-419.

Nakazawa et al., *Nonlinear Pulse Transmission Through an Optical Fiber at Zero-Average Group Velocity Dispersion*, IEEE Photonics Technology Letters, vol. 8, No. 3, Mar. 1996, pp. 452-454.

Smith et al., *Reduced Gordon-Haus Jitter Due to Enhanced Power Solitons in Strongly Disperson Managed Systems*, Electronic Letters, vol. 32, No. 22, Oct. 24, 1994, pp. 2085-2086.

Smith et al., *Enhanced Power Solitons in Optical Fibers with Periodic Dispersion Management*, Electronics Letters, vol. 32, No. 1, Jan. 4, 1996, pp. 54-55.

Golovchenko et al., *Collision-induced Timing Jitter Reduction by Periodic Dispersion Management in Soliton WDM Transmission*, Electronics Letters, vol. 33, No. 9, Apr. 24, 1997, pp. 735-736.

Smith et al., *Energy-scaling Characteristics of Solitons in Strongly Dispersion Managed Fibers*, Optics Letters, vol. 21, No. 24, Dec. 15, 1996, pp. 1981-1983.

S.B. Alleston, P. Harper, I.S. Penketh, I. Bennion, and N.J. Doran, INSPEC Abstract No. A2000-02-4280S-032, B2000-01-6260F-038; "1220 km propagation of 40 Gbit/s single channel RZ data over dispersion managed standard (non-dispersion shifted) fibre", Cat. No. 99CH36322 (1999), Suppl. Publication, pp. PD3/1-PD3-3.

S.B. Alleston, P. Harper, I.S. Penketh, I. Bennion, and N.J. Doran, INSPEC Abstract No. B1999-03-6260M-005: "40 Gbit/s single channel dispersion managed pulse propagation in standard fibre over 509 km", *Electronics Letters*, vol. 35, No. 1 (Jan. 7, 1999), pp. 57-59.

S.B. Alleston, P. Harper, I.S. Penketh, I. Bennion, N.J. Doran, and A.D. Ellis, INSPEC Abstract No. B1999-06-6260M-059, "40 Gbit/s soliton transmission over dispersion managed standard fibre links", IEEE Colloquium on High Speed and Long Distance Transmission (Ref. No. 1999/022) (1999), pp. 2/1-2/4.

S.B. Alleston, P. Harper, I.S. Penketh, I. Bennion, N.J. Doran, and A.D. Ellis, INSPEC Abstract No. B1999-08-6260F-001: "1000 km transmission of 40 Gbit/s single channel RZ data over dispersion managed standard (non-dispersion shifted) fibre", *Electronics Letters*, vol. 35, No. 10 (May 13, 1999), pp. 823-824.

S. Alleston, I. Penketh, P. Harper, A. Niculae, I. Bennion, and N.J. Doran, INSPEC Abstract No. B1999-12-6260-005: "16000 KM 10 Gbits$^{-1}$ soliton transmission over standard fibre by reduction of interactions through optimum amplifier positioning", Cat. No. 99CH36322, vol. 2 (1999), pp. WC4-1/41-WC4-3/43.

A. Bernstson, D. Anderson, N.J. Doran, W. Forysiak, and J.H.B. Nijhof, INSPEC Abstract No. B9812-6260-227: "Power dependence and accessible bandwidth for dispersion-managed solitons in asymmetric dispersion maps", *Electronics Letters*, vol. 34, No. 21 (Oct. 15, 1998), pp. 2054-2056.

A. Berntson, N.J. Doran, W. Forysiak, and J.H.B. Nijhof, INSPEC Abstract No. A9818-4265S-003, B9809-4340-086, "Power dependence of dispersion-managed solitons for anomalous, zero, and normal path-average dispersion", *Optics Letters*, vol. 23, No. 12 (Jun. 15, 1998), p. 900-902.

K.J. Blow and N.J. Doran, Genuine Article No. EW885, "Solitons across The Atlantic", *Physics World*, vol. 4, No. 2 (1991), pp. 33-34.

K.J. Blow and N.J. Doran, INSPEC Abstract No. A82102951, B82059670, "High bit rate communication systems using non-linear effects", *Optics Communications*, vol. 42, No. 6 (Aug. 15, 1982), pp. 403-406.

K.J. Blow and N.J. Doran, INSPEC Abstract No. B83040547, "Bandwidth limits of nonlinear (soliton) optical communication systems", *Electronics Letters*, vol. 19, No. 11 (May 26, 1983), pp. 429-430.

K.J. Blow and N.J. Doran, INSPEC Abstract No. A84044149: "Global and local chaos in the pumped nonlinear Schrödinger equation", *Physical Review Letters*, vol. 52, No. 7 (Feb. 13, 1984), pp. 526-529.

K.J. Blow and N.J. Doran, INSPEC Abstract No. A850409959: "Multiple dark soliton solutions of the nonlinear Schrödinger equation", *Physics Letters*, vol. 107A, No. 2 (Jan. 14, 1985), pp. 55-58.

K.J. Blow and N.J. Doran, INSPEC Abstract No. A85053890, "The asymptotic dispersion of soliton pulses in lossy fibres", *Optics Communications*, vol. 52, No. 5 (Jan. 1, 1985), pp. 367-370.

K.J. Blow and N.J. Doran: INSPEC Abstract No. A87103907, B87054402, "Nonlinear effects in optical fibres and fibre devices", *IEE Proceedings*, vol. 134, Pt. J, No. 3 (Jun. 1987), pp. 138-144.

K.J. Blow and N.J. Doran, INSPEC Abstract No. A91120943: "Average soliton dynamics and the operation of soliton systems with lumped amplifiers", *IEEE Photonics Technology Letters*, vol. 3, No. 4 (Apr. 1991), pp. 369-371.

K.J. Blow, N.J. Doran, and S.J.D. Phoenix, INSPEC Abstract No. A9211-4265-001, "The soliton phase", *Optics Communications*, vol. 88, No. 2,3 (Mar. 15, 1992), pp. 137-140.

K.J. Blow, N.J. Doran, and D. Wood: INSPEC Abstract No. A88043167, B88020371, "Trapping of energy into solitary waves in amplified nonlinear dispersive systems", *Optics Letters*, vol. 12, No. 12 (Dec. 1987), pp. 1011-1013.

K.J. Blow, N.J. Doran, and D. Wood: INSPEC Abstract No. A88060956, B88033651: "Generation and stabilization of short soliton pulses in the amplified nonlinear Schrödinger equation", *J. Opt. Soc. Am. B*, vol. 5, No. 2 (Feb. 1988), pp. 381-391.

J.F. Devaney, W. Forysiak, and N.J. Doran, INSPEC Abstract No. A9803-4265S-004, B9802-4340-021: "Soliton collisions in dispersion-managed WDM systems", *ECOC '97*, Conf. Publ. No. 448, vol. 3 (Sep. 22-25, 1997), pp. 223-226.

J.F.L. Devaney, W. Forysiak, and N.J. Doran, INSPEC Abstract No. B1999-07-6260M-022: "Reduction of collision induced timing jitter in multichannel soliton systems by dispersion management", *ECOC '98*, IEEE Cat. No. 98TH8398, vol. 1, pp. 89-90.

J.F.L. Devaney, W. Forysiak, A.M. Niculae, and N.J. Doran, INSPEC Abstract No. A9803-4280S-015, B9802-6260-024: "Soliton collisions in dispersion-managed wavelength-division-multiplexed systems", *Optics Letters*, vol. 22, No. 22 (Nov. 15, 1997), pp. 1695-1697.

J.F.L. Devaney, W. Forysiak, N.J. Smith, and N.J. Doran, INSPEC Abstract No. B9706-6260-081: "Modeling WDM soliton transmission in dispersion-managed systems", IEE Colloquium on WDM Technology and Applications (Ref. No. 1997/036) (1997), 4/1-4/4.

J.F.L. Devaney, Y. Forysiak, N.J. Smith, and N.J. Doran, INSPEC Abstract No. B9808-6260-180: "WDM of enhanced power solitons in strongly dispersion-managed systems", *OFC '97 Technical Digest*, vol. 6 IEEE Cat. No. 97CH36049, (1997), pp. 306-307.

N.J. Doran, E.I. No. EIP02016818279: "Soliton communications systems: The concept is alive", Conference Proceedings—Lasers and Electro-Optics Society Annual Meeting—LEOS, vol. 1, IEEE Cat. No. 01CH37242 (2001), pp. 214-215.

N.J. Doran, E.I. No. EIP98044174957: "Dispersion-managed solitons: A new paradigm for high data rate", *OFC '98 Technical Digest*, IEEE Cat. No. 98CH36177, p. 265.

N.J. Doran, Genuine Article No. HC722, "Solitons the key to global cheap-talk", *Physics World* (Feb. 1992, vol. 5, No. 2, p. 25.

N.J. Doran, Inside Conference Item ID: CN008356099, "Nonlinear Phenomena in Optical Fibres", *NATO ASI Series E Applied Sciences*, vol. 289 (1995), pp. 75-102.

N.J. Doran, INSPEC Abstract No. A1999-14-4280S-012, B1999-07-6260M-024: "Dispersion managed soliton systems", ECOC '98, IEEE Cat. No. 98TH8398, vol. 1 (Sep. 20-24, 1998), pp. 97-99.

N.J. Doran: INSPEC Abstract No. A86090313, B86048178: "Nonlinear pulse propagation in optical fibres", *IOOC—ECOC '85*, vol. 2, pp. 157-164.

N.J. Doran, INSPEC Abstract No. A9421-4282-014, B9411-4125-034: "All-optical control and future opportunities for ultra high speed transmission on optical fibres", *EFOC & N '94*, pp. 5-7.

N.J. Doran and K.J. Blow, INSPEC Abstract No. A84049551, B84025386: "Solitons in optical communications", *IEEE Journal of Quantum Electronics*, vol. QE-19, No. 12 (Dec. 1983), pp. 1883-1888.

N.J. Doran and W. Forysiak, INSPEC Abstract No. A9404-4265F-015, B9402-4340-092: "Optimizing the capacity of soliton systems", *IEE Colloquium on 'Ultra-Short Optical Pulses'*, Digest No. 1993/202, pp. 10/1-10/2.

N.J. Doran and W. Forysiak, INSPEC Abstract No. A9518-4265S-012, B9510-4340-083: "Phase conjugation for jitter and soliton—soliton compensation in soliton communications", *CLEO '94*, Cat. No. 94CH3463-7, vol. 8, pp. 367-368.

N.J. Doran, W. Forysiak, P. Harper, S.B. Alleston, S.K. Turitsyn, and D. Govan, INSPEC Abstract No. A2000-02-4281-021, B2000-01-4125-102: "The dispersion management of solitons", *ACOFT/AOS '99*, pp. 5-9.

N.J. Doran, W. Forysiak, F.M. Knox, N.J. Smith, and I. Bennion, INSPEC Abstract No. A9610-4280S-003, B9605-6260-186: "Optimizing transmission capacity: long distance and terrestrial applications", *Phil. Trans. R. Soc. Lond. A* (Mar. 15, 1996), pp. 679-694.

N.J. Doran, W. Forysiak, J.H. B. Nijhof, A.M. Niculae and N.J. Doran, Inside Conference Item ID: CN025778248: "Remarkable Features of DM Solitons: Implications for High Speed and WDM Systems", *New Trends in Optical Soliton Transmission Systems*, vol. 5 (1998), pp. 303-316.

N.J. Doran, W. Forysiak, J.H.B. Nijhof; and A. Niculae, 02503004 Inside Conference Item ID: CN026121447: "Remarkable properties of dispersion managed solitons", *OSA Technical Digest Series*, Abst. No. WSB1, vol. 5(Mar. 29, 1998),, p. xix.

N.J. Doran, W. Forysiak, N.J. Smith, and J.F.L. Devaney, E.I. No. EIP97083773098: "Soliton dynamics in periodically varying dispersion systems", *QELS '97*, IEEE Cat. No. 97CB36111, vol. 12, pp. 55-56.

N.J. Doran, W. Forysiak, N.J. Smith, F.M. Knox, and K.M. Allen, INSPEC Abstract No. A9518-4265S-003, B9510-6260-024, "Design of soliton systems for optimum capacity", *Pure Appl. Opt.*, vol. 4 (Jul. 1995), pp. 271-279.

N.J. Doran, N.J. Smith, W. Forysiak, and F.M. Knox, Inside Conference Item ID: CN015687880: "Dispersion As Control Parameter in Soliton Transmission Systems", *Physics and Applications of Optical Solitons in Fibers '95*, vol. 3 (1996), pp. 1-14.

N.J. Doran, N.J. Smith, W. Forysiak and F.M. Knox, "Dispersion as Control Parameter in Soliton Transmission System", Physics and Applications of Optical Solitons in Fibres '95: Proceedings of the Symposium held in Kyoto, Japan, Nov. 14-17, 1995, pp. 14-17.

N. Edagawa, I. Morita, M. Suzuki, S. Yamamoto, H. Taga, and S. Akiba: "20 Gbit/s, 8100 km straight-line single channel soliton-based RZ transmission experiment using periodic dispersion compensation", *Proc. 21st Euro. Conf. on Opt. Comm. (ECOC '95—Brussels)* (1995), pp. Th.A.3.5/983-Th.A.3.5/986.

A. Ellis, J.D. Cox, D. Bird, J. Regnault, J.V. Wright, and W.A. Stallard., "5 Gbit/s soliton propagation over 350 km with large periodic dispersion coefficient perturbations using erbium doped fiber amplifier repeaters", *Electronics Letters*, vol. 27, No. 10 (May 9, 1991), pp. 878-880.

W. Forysiak and N.J. Doran, Inside Conference Item ID: CN000566111: Stepwise dispersion profiling of periodically amplified soliton systems, *Technical Digest Series*—Optical Society of America (OSA), vol. 15 (1993), pp. TuA4-1/170-TuA4-4/173.

W. Forysiak, K.J. Blow, and N.J. Doran, INSPEC Abstract No. B9310-6260-036: "Reduction of Gordon-Haus jitter by post-transmission dispersion compensation", *Electronics Letters*, vol. 29, No. 13 (Jun. 24, 1993), pp. 1225-1226.

W. Forysiak, J.F. L. Devaney, N.J. Smith, and N.J. Doran, INSPEC Abstract No. A9714-4281-008, B9707-6260-082: "Dispersion management for wavelength-division-multiplexed soliton transmission", *Optics Letters*, vol. 22, No. 9 (May 1, 1997), pp. 600-602.

W. Forysiak and N.J. Doran, INSPEC Abstract No. A9514-4280S-015, B9508-6260-034: "Reduction of Gordon—Haus jitter in soliton transmission systems by optical phase conjugation", *Journal of Lightwave Technology*, IEEE Log No. 9411022, vol. 13, No. 5 (May 1995), pp. 850-855.

W. Forysiak, N.J. Doran, F.M. Knox, and K.J. Blow, INSPEC Abstract No. A9514-4265S-002, B9508-4340-012 "Average soliton dynamics in strongly perturbed systems", *Optics Communications*, vol. 117 (May 15, 1995), pp. 65-70.

W. Forysiak, F.M. Knox, and N.J. Doran, INSPEC Abstract No. A9408-4281-011, B9404-4125-026: "Average soliton propagation in periodically amplified systems with stepwise dispersion-profiled fiber", *Optics Letters*, vol. 19, No. 3 (Feb. 1, 1994), pp. 174-176.

W. Forysiak, F.M. Knox, and N.J. Doran, INSPEC Abstract No. A9422-4265-012, B9411-4340-074: "Stepwise dispersion profiling of periodically amplified soliton systems", *Journal of Lightwave Technology*, vol. 12, No. 8 (Aug. 1994), pp. 1330-1337.

W. Forysiak, J.H.B. Nijhof, and N.J. Doran, INSPEC Abstract No. A2000-16-4281-008, B2000-08-4125-043: "Dispersion managed solitons: the key to terabit per second optical fiber communication systems", *Optics & Photonics News*, vol. 11, No. 5 (May 2000), pp. 35-39.

I.R. Gabitov and S.K. Turitsyn, "Breathing Soliton in Cascaded Transmission System with Passive Dispersion Compensation", Physics and Applications of Optical Solitons in Fibers '95: Proceedings of the Symposium held in Kyoto, Japan, Nov. 14-17, 1995, pp. 365-373.

D.S. Govan, W. Forysiak, and N.J. Doran, Inside Conference Item ID: CN026120765: "40 Gbit/s soliton transmission over standard fiber with dispersion management", *OSA Technical Digest Series*, vol. 5 (1998), pp. NWE10-1/89-NWE10-3/91.

D.S. Govan, W. Forysiak, and N.J. Doran, Inside Conference Item ID: CN030112236: "40 Gbit/s RZ transmission over more than 2000 km of standard fibre with dispersion management", Colloquium Digest—IEE (1999), Issue 22, pp. 3/1-3/6.

D.S. Govan, W. Forysiak, and N.J. Doran, INSPEC Abstract No. A9901-4280S-011, B9901-6260C-006: "Long-distance 40-Gbit/s soliton transmission over standard fiber by use of dispersion management", *Optic Letters*, vol. 23, No. 19 (Oct. 1, 1998), pp. 1523-1525.

D.S. Govan, N.J. Smith, F.M. Knox, and N.J. Doran, INSPEC Abstract No. A9802-4281-004, B9801-4125-040: "Stable propagation of solitons with increased energy through the combined action of dispersion management and periodic saturable absorption", *J. Opt. Soc. Am. B*, vol. 14, No. 11 (Nov. 1997), pp. 2960-2966.

D.S. Govan, S.K. Turitsyn, and N.J. Doran, INSPEC Abstract No. B2001-02-6260F-054: "40-Gbit/s dispersion-managed soliton transmission over 3000 km of standard fiber through optimization of dispersion map parameters", *CLEO 2000*, Cat. No. 00CH37088, pp. 238-239.

A. Hasegawa (Ed.), "Physics and Applications of Optical Solitons in Fibres '95", Proceedings of the Symposium held in Kyoto, Japan, Nov. 14-17, 1995, Table of Contents.

A. Hasegawa and Y. Kodama, Guiding-center soliton fibers with periodically varying dispersion, *Optics Letters*, vol. 16, No. 18 (Sep. 15, 1991), pp. 1385-1387.

P. Harper, S.B. Alleston, I. Bennion, and N.J. Doran, INSPEC Abstract No. B2000-02-6260F-003: "40 Gbit/s dispersion managed soliton transmission over 1160 km in standard fibre with 75 km span length", *Electronics Letters*, vol. 35, No. 24 (Nov. 25, 1999), pp. 2128-2129.

P. Harper, S.B. Alleston, and N.J. Doran, Inside Conference Item ID: CN037961966: "80 Gbit/s RZ Transmission over 523 km Using Dispersion Compensated Standard Fibre", 26th European Conference on Optical Communication (2000), vol. 2, pp. 143-145 VDE.

P. Harper, S.B. Alleston, W. Forysiak, and N.J. Doran, INSPEC Abstract No. B2001-02-6260C-035: "10 Gbit/s dispersion-managed soliton transmission over 13,400 km in a weak symmetric non-zero dispersion shifted fiber dispersion map", *TOPS*, vol. 39 (IEEE Cat. No. 00CH37088) (2000), pp. 237-238.

P. Harper, S.B. Alleston, D.S. Govan, W. Forysiak, I. Bennion, and N.J. Doran, Inside Conference Item ID: CN036435057: "40 Gbit/S Recirculating Loop Experiments on Dispersion Managed Standard Fibre", Solid State Science and Technology Library (2000), vol. 6, pp. 387-402.

P. Harper, S.B. Alleston, I.S. Penketh, D.S. Govan, I. Bennion, A.D. Ellis, and N.J. Doran, INSPEC Abstract No. B2000-07-6260F-012: "40 Gbit/s nonlinear RZ pulse propagation over 900 km with a 75 km standard fibre span using dispersion compensation: optimization of the launch position", *ECOC '99*, vol. 1, pp. I-232-I-233.

P. Harper, F.M. Knox, D.S. Govan, P.N. Kean, I. Bennion, and N.J. Doran, INSPEC Abstract No. B9806-6260-126: "Long distance 10 Gbit/s soliton transmission over standard fibre with periodic dispersion compensation", Core and ATM Networks NOC '97, pp. 18-24.

P. Harper, F.M. Knox, P.N. Kean, I. Bennion, and N.J. Doran, INSPEC Abstract No. B9806-6260-126: "10 Gbit/s soliton propagation over 5250 km in standard fiber with dispersion compensation", *OFC '97 Technical Digest*, vol. 6 (1997) (IEEE Cat. No. 97CH36049), pp. 304-305.

P. Harper, F.M. Knox, P.N. Kean, L. Zhang, N.J. Doran, and I. Bennion, INSPEC Abstract No. A9612-4265S-016, B9607-4340-039: "Soliton transmission over 2700 km using an in-fibre Bragg grating filter to give Gordon-Haus jitter reduction", IEE Colloquium on Optical Solitons: Principles and Applications (Digest No. 1996/090), pp. 8/1-8/4.

P. Harper, F.M. Knox, P.N. Kean, L. Zhang, N.J. Doran, and I. Bennion, E.I. No. EIP96110399059: "Jitter suppression in a 2700 km soliton propagation experiment using only a fibre Bragg grating filter", Conference on Lasers and Electro-Optics Europe—Technical Digest, CThF3 (1996), p. 245.

P. Harper, I.S. Penketh, S.B. Alleston, I. Bennion, and N.J. Doran, INSPECT Abstract No. B9812-6260-152: "10 Gbit/s dispersion managed soliton propagation over 200 Mm without active control", *Electronics Letters*, vol. 34, No. 21 (Oct. 15, 1998), pp. 1997-1999.

P. Harper, I.S. Penketh, S.B. Alleston, and N.J. Doran, INSPEC Abstract No. A1999-14-4280S-015, B1999-07-6260=011: "200 000 km 10 Gbit/s soliton propagation exploiting periodic saturable absorption", *ECOC '98*, IEEE Cat. No. 98TH8398, vol. 1 (Sep. 20-24, 1998), pp. 107-108.

P. Harper, I.S. Penketh, and N.J. Doran, INSPEC Abstract No. A9820-4281-012, B9810-4125-043: "Dispersion-optimized soliton propagation over 24 000 km in standard fibre using dispersion compensation", Long-Haul, ATM and Multi-Media Networks NOC '98, pp. 244-252.

M.N. Islam, C. E. Soccolich, and J. P. Gordon, "Soliton Intensity-Dependent Polarization Rotation", *Optics Letters*, vol. 15, No. 1 (Jan. 1, 1990).

S.M.J. Kelly, K. Smith, K.J. Blow, and N.J. Doran, INSPEC Abstract No. A91141490, B91077790: "Average soliton dynamics of a high-gain erbium fiber laser", *Optics Letters*, vol. 16, No. 17 (Sep. 1, 1991), pp. 1337-1339.

F.M. Knox, P. Harper, P.N. Kean, I. Bennion, and N.J. Doran, Inside Conference Item ID CN014437473: "10 Gbit/s soliton transmission over standard fibre", *Colloquium Digest—IEE*, Issue 90 (1996), pp. 13/1-13/4.

F.M. Knox, W. Forysiak, and N.J. Doran, INSPEC Abstract No. A9524-4265S-003, B9512-4340-074: "10-Gbit/s soliton communication systems over standard fiber at 1.55 μm and the use of dispersion compensation", Journal of Lightwave Technology, vol. 13, No. 10 (Oct. 1995), pp. 1955-1962.

F.M. Knox, W. Forysiak, and N.J. Doran, E.I. No. EP95012505817: "Upgrading standard fibre communication links to 10 Gbit/s using solitons and dispersion compensation", Conference on Lasers and Electro-Optics Europe—Technical Digest (1994), IEEE, Cat. No. 94TH0614-8, pp. 279-280.

F.M. Knox, P. Harper, P.Kean, I. Bennion, and N.J. Doran, INSPEC Abstract No. A9720-4280S-005, B9710-6260-204: "Soliton transmission at 10 Gbit/s over 2022 km of standard fibre with dispersion compensation", ECOC'96, 22nd European Conference on Optical Communication, IEEE Cat No. 96TH8217, vol. 3, pp. WeC.3.2/3.101-WeC.3.2/3.104.

F.M. Knox, P. Harper, P.N. Kean, N.J. Doran, and I. Bennion, INSPEC Abstract No. B9511-4125-030: "Low jitter long distance pulse transmission near net fibre dispersion zero wavelength", Electronics Letters, vol. 31, No. 17 (Aug. 17, 1995), pp. 1467-1468.

H. Kubota and M. Nakazawa, "A Dispersion-Allocated Soliton and Its Impact on Soliton Communication", Physics and Applications of Optical Solitons in Fibres '95: Proceedings of the Symposium held in Kyoto, Japan, Nov. 14-17, 1995, pp. 27-36.

H. Kubota and M. Nakazawa, "Partial soliton communication system", Optical Communications, vol. 87, No. 1,2 (Jan. 1, 1992), pp. 15-18.

V.K. Mezentsev, S.K. Turitsyn, and N.J. Doran, INSPEC Abstract No. B2001-01-6260-002: "System optimization of 80 Gbit/s single channel transmission over 1000 km of standard fibre", Electronics Letters, vol. 36, No. 23 (Nov. 9, 2000), pp. 1949-1951.

M. Nakazawa and H. Kubota, "Optical soliton communication in a positively and negatively dispersion-allocated optical fibre transmission line", Electronics Letters, vol. 31, No. 3 (Feb. 2, 1995), pp. 216-217.

B.P. Nelson, D. Cotter, K.J. Blow, and N.J. Doran, INSPEC Abstract No. A83095161, "Large nonlinear pulse broadening in long lengths of monomode fibre", IEEE (1983), pp. 7/1-7/3.

B.P. Nelson, D. Cotter, K.J. Blow, and N.J. Doran, INSPEC Abstract No. A 84024075: "Large nonlinear pulse broadening in long lengths of monomode fibre", Optics Communications, vol. 48, No. 4 (Dec. 15, 1983), pp. 292-294.

A.M. Niculae, W. Forysiak, and N.J. Doran, 02502966 Inside Conference Item ID: CN026121447: "Remarkable properties of dispersion managed solitons", OSA Technical Digest Series vol. 5 (1998), pp. NThD3/184-NThD3-3/186.

A.M. Niculae, W. Forysiak, and N.J. Doran, INSPEC Abstract No. A1999-10-4280S-033, B1999-05-6260M-072: "Optimal amplifier location in strong dispersion-managed soliton systems", IEE Colloquium Optical Solitons (Ref. No. 1999/016), pp. 8/1-8/4.

A.M. Niculae, W. Forysiak, and N.J. Doran, INSPEC Abstract No. A2000-06-4265S-019, B2000-03-4340S-030: "Optical Amplifier location in strong dispersion-managed soliton systems", Conference on Lasers and Electro-Optics CLEO '99) (IEEE Cat. No. 99CH37013) (1999), pp. 236-237.

A.M. Niculae, W. Forysiak, A.J. Gloag, T.H.B. Nijhof, and N.J. Doran, INSPEC Abstract No. B9812-6260-236: "Soliton collisions with wavelength-division multiplexed systems with strong dispersion management", Optics Letters, vol. 23, No. 17 (Sep. 1, 1998), pp. 1354-1356.

J.H.B. Nijhof, and N.J. Doran, Inside Conference Item ID: CN03634995: "Symmetry-Breaking and Bistability for Dispersion-Managed Solitions", Massive WDM and TDM Soliton Transmission Systems, vol. 6 (2000), pp. 299-308.

J.H.B. Nijhof, N.J. Doran, and W. Forysiak, INSPEC Abstract No. A1999-14-4280S-014, B1999-07-6260F-011: "Dispersion-managed solitons in the normal dispersion regime: a physical interpretation", ECOC '98, IEEE Cat. No. 98TH8398, vol. 1, pp. 103-104.

J.H.B. Nijhof, N.J. Doran, and W. Forysiak, INSPEC Abstract No. A9820-4281-019, B9810-4125-058: "Energy enhancement of dispersion-managed solitons for strong dispersion maps", 1998 OSA Technical Digest Series, IEEE Cat. No. 98CH36177, vol. 2, p. 268.

J.H.B. Nijhof, N.J. Doran, W. Forysiak, and A. Berntson, INSPEC Abstract No. B9805-6260-088: "Energy enhancement of dispersion-managed solitons and WDM", Electronics Letters, vol. 34, No. 5 (Mar. 5, 1998), pp. 481-482.

J.H.B. Nijhof, N.J. Doran, W. Forysiak, and F.M. Knox, INSPEC Abstract No. A9723-4281-012, B9712-6260-048: "Stable soliton-like propagation in dispersion managed systems with net anomalous, zero and normal dispersion", Electronics Letters, vol. 33, No. 20 (Sep. 25, 1997), pp. 1726-1727.

J.H.B. Nijhof, W. Forysiak, and N.J. Doran, INSPEC Abstract No. A1999-03-4280S-022, B1999-02,6260V-029: "Dispersion-managed solitons in the normal dispersion regime: a physical interpretation", Optics Letters, vol. 23, No. 21 (Nov. 1, 1998), pp. 1674-1676.

J.H.B. Nijhof, W. Forysiak, and N.J. Doran, INSPEC Abstract No. A2000-16-4265S-009, B2000-08-4340S-007: "The averaging method for finding exactly periodic dispersion-managed solitons", IEEE Journal of Selected Topics in Quantum Electronics, vol. 6, No. 2 (Mar./Apr. 2000), pp. 330-336.

C. Paré, A. Villeneuve, P.-A. Bélanger, and N.J. Doran, INSPEC Abstract No. A9611-4265J-004, B9606-4340-090: "Compensating for dispersion and the nonlinear Kerr effect without phase conjugation", Optics Letters, vol. 21, No. 7 (Apr. 1, 1996), pp. 459-461.

C. Paré, A. Villeneuve, P.-A. Bélanger, N. Bélanger, and N.J. Doran, INSPEC Abstract No. A9709-4280S-018, B9705-6260-040, "Dispersion and self-phase modulation compensation based on a negative nonlinearity", Technical Digest Series, vol. 6 (1996), pp. IthA7-1/598-IthA7-4/601.

I.S. Penketh, P. Harper, S.B. Alleston, A.M. Niculae, I. Bennion, and N.J. Doran, INSPEC Abstract No. A1999-17-4280S-034, B1999-09-6260-009: "10-Gbit/dispersion-managed soliton transmission over 16,500 km in standard fiber by reduction of soliton interactions", Optics Letters, vol. 24, No. 12 (Jun. 15, 1999), pp. 802-804.

L.J. Richardson, W. Forysiak, and N.J. Doran, Inside Conference Item ID: CN037962909: "320 Gbit/s Single Channel Transmission 4,500 Km Using Short Period Dispersion Management", 26th European Conference on Optical Communication (2000), vol. 3, pp. 187-188 VDE.

L.J. Richardson, W. Forysiak, and N.J. Doran, INSPEC Abstract No. A1001-01-4265S-023, B2001-01-4340S-016: Energy enhancement of short-period dispersion-managed solitons, CLEO 2000, TOPS, vol. 39 (IEEE Cat. No. 00CH37088) (2000), pp. 32-33.

L.J. Richardson, W. Forysiak, and N.J. Doran, INSPECT Abstract No. A2000-19-4265S-004, B2000-10-4340S-003: "Dispersion-managed soliton propagation in short-period dispersion maps", Optics Letters, vol. 25, No. 14 (Jul. 2000), pp. 1010-1012.

L.J. Richardson, W. Forysiak, and N.J. Doran, INSPEC Abstract No. B2001-05-6260-011: "Trans-oceanic 160 Gb/s single-channel transmission using short-period dispersion management", IEEE Photonics Technology Letters, vol. 13, No. 3 (Mar. 2001), pp. 209-211.

L.J. Richardson, W. Forysiak, N.J. Doran, and K.J. Blow, INSPECT Abstract No. B2001-07-6260-016: "Long-haul ultra high-speed transmission using dispersion managed solitons", IEICE Trans. Electron., vol. E84-C, No. 5 (May 2001), pp. 533-540.

L.J. Richardson, W. Forysiak, N.J. Doran, K.J. Blow, INSPEC Abstract No. B2001-08-6260C-032: "Long-haul ultra high-speed transmission using dispersion managed solitons", IEICE Trans. Commun., vol. E84-B, No. 5 (May 2001), pp. 1159-1166.

L.J. Richardson, W. Forysiak, N.J. Doran, and K.J. Blow, JICST Accession No. 01A0565348 File Segment: JICST-E, "Long-Haul Ultra High-Speed Transmission Using Dispersion Managed Solitons", IEICE Trans Electron (May 2001), vol. E84-C, No. 5, Fig. 10, Ref. 50, pp. 533-540.

N.J. Smith and N.J. Doran, INSPEC Abstract No. A9612-4281-009, B9607-4125-008: "Modulational instabilities in fibers with periodic dispersion management", Optics Letters, vol. 21, No. 8 (Apr. 15, 1996), pp. 570-572.

N.J. Smith and N.J. Doran, INSPEC Abstract No. B9510-6260-179: "Gordon-Haus jitter suppression using a single phase modulator in long span soliton systems", ECOC '95, 20th European Conference on Optical Communication, vol. 1 (1995), pp. 241-244.

N.J. Smith, N.J. Doran, and W. Forysiak, INSPEC Abstract No. A9609-4280S-013, B9605-6260-075: "Gordon-Haus jitter suppression using an intra-span phase modulator and post transmission dispersion compensator", IEEE Photonics Technology Letters, vol. 8, No. 3 (Mar. 1996), pp. 455-457.

N.J. Smith, N.J. Doran, W. Forysiak, F.M. Knox, INSPEC Abstract No. A9723-4281-005, B9712-4125-007: "Soliton transmission using periodic dispersion compensation", Journal of Lightwave Technology, vol. 15, No. 10 (Oct. 1997), pp. 1808-1822.

N.J. Smith, N.J. Doran, F.M. Knox, and W. Forysiak, INSPEC Abstract No. A9707-4265S-010, B9704-4340-042: "Energy-scaling characteristics of solitons in strongly dispersion-managed fibers", *Optics Letters*, vol. 21, No. 24 (Dec. 15, 1996), pp. 1981-1983.

N.J. Smith, W. Forysiak, and N.J. Doran, INSPEC Abstract No. B9701-6260-010: "Reduced Gordon-Haus jitter due to enhanced power solitons in strongly dispersion managed systems", *Electronics Letters*, vol. 32, No. 22 (Oct. 24, 1996), pp. 2085-2086.

N.J. Smith, W. Forysiak, and N.J. Doran, INSPECT Abstract No. B9808-6260-182: "Gordon-Haus jitter reduction in enhanced power soliton systems", *OFC '97 Technical Digest*, vol. 6, IEEE Cat. No. 97CH36049, p. 309.

N.J. Smith, F.M. Knox, N.J. Doran, K.J. Blow, and I. Bennion, INSPEC Abstract No. B9603-6260-093: "Enhanced power solitons in optical fibres with periodic dispersion management", *Electronics Letters*, vol. 32, No. 1 (Jan. 4, 1996), pp. 54-55.

N.J. Smith, F.M. Knox, N.J. Doran, K.J. Blow, and I. Bennion, INSPEC Abstract No. A9612-424265S-014, B9607-4340-037: "Dispersion management of optical fibre solitons", IEE Colloquium on Optical Solitons: Principles and Applications (Digest No. 1996/090), pp. 6/1-6/5.

M. Suzuki, N. Edagawa, I. Morita, S. Yamamoto, H. Taga, and S. Akiba., "Multi-Ten Gbit/s Soliton Transmission Over Transoceanic Distances", Physics and Applications of Optical Solitons in Fibres '95: Proceedings of the Symposium held in Kyoto, Japan, Nov. 14-17, 1995, pp. 375-391.

M. Suzuki, I. Morita, N. Edagawa, S. Yamamoto, H. Taga, and S. Akiba, "Reduction of Gordon-Haus timing jitter by periodic dispersion compensation in soliton transmission", *Electronics Letters*, vol. 31 (Nov. 9, 1995), pp. 2027-2029.

M. Suzuki, I. Morita, S. Yamamoto, N. Edagawa, H. Taga, and S. Akiba: "Timing jitter reduction by periodic dispersion compensation in soliton transmission", *Optical Fibre Communications (OFC'95)*, Opt. Soc. Am., Washington, D.C., Paper PD20-1/401-PS20-4/404.

S.K. Turitsyn, N.J. Doran, J.H.B. Nijhof, V.K. Mezentsev, T. Schäfer, and W. Forysiak, Inside Conference Item ID: CN037481040: "Dispersion-Managed Solitons", Centre de Physique—Publications (1999), Springer, No. 12, pp. 91-115.

S.K. Turitsyn, N.J. Doran, E.G. Turitsyna, E.G. Shapiro, and M.P. Fedoruk, INSPEC Abstract No. A2001-01-4265S-022, B2001-01-4340S-015: "Soliton interaction in optical communication systems with short-scale dispersion management", CLEO 2000, *TOPS*, vol. 39, IEEE Cat. No. 00CH37088, pp. 30-31.

S.K. Turitsyn, N.J. Doran, E.G. Turitsyna, E.G. Shapiro, M.P. Fedoruk, and S.B. Medvedev, Inside Conference Item ID: CN036434946: "Optical communication Systems with Schort-Scale Dispersion Management", *Solid State Science and Technology Library* (2000), vol. 6, pp. 235-251.

S.K. Turitsyn, M.P. Fedoruk, N.J. Doran, and W. Forysiak, INSPEC Abstract No. B2000-08-6260F-006: "Optical Soliton transmission in fiber lines with short-scale dispersion management", *ECOC '99 Conference*, vol. 1 (Sep. 26-30, 1999), pp. I-382-I-383.

S.K. Turitsyn, M.P. Fedoruk, W. Forysiak, and N.J. Doran, INSPEC Abstract No. A2000-02-4280S-029, B2000-01-6260C-071: "Dispersion-management in fiber communication lines using Raman amplification", *Optics Communications*, vol. 170, Nos. 1-3 (Oct. 15, 1999), pp. 23-27.

S.K. Turitsyn, J.H.B. Nijhof, V.K. Mezentsev, and N.J. Doran, INSPEC Abstract No. A2000-04-4281-014, B2000-02-4125-089: "Symmetries, chirp-free points, and bistability in dispersion-managed fiber lines", *Optics Letters*, vol. 24, No. 24 (Dec. 15, 1999), pp. 1871-1873.

N.J. Doran et al., "Dispersion as a Control Parameter in Soliton Transmission," *Electronic Engineering and Applied Physics*, No. 14-17, 1995, pp. 1-12.

Govind P. Agrawal, "Nonlinear Fiber Optics", Second Ed., Academic Press, San Diego, CA 1995, pp. 60-63, 144, 145, 150, 151, 164, 165.

Katsunari Okamoto, "Fundamentals of Optical Waveguides", Academic Press, USA, 1992, pp. 173-192.

U.S. Appl. No. 10/713,037, filed Nov. 17, 2003, Doran.

Atkinson, et al., "Increased amplifier spacing in a soliton system with quantum-well saturable absorbers and spectral filtering", *Optics Letters*, vol. 19, No. 19, (Oct. 1, 1994), pp. 1514-1516.

Paschotta, R., "Saturable Absorbers", Encyclopedia of Laser Physics and Technology [online], Feb. 26, 2006 [retrieved on Mar. 3, 2006]. Retrieved from the Internet: <URL: www.rp-photonics.com/saturable$_{13}$ absorbers.html>, pp. 1-3.

Nakazawa, M. et al., "Optical Soliton Communication in a Positively and Negatively Dispersion-Allocated Optical Fibre Transmission Line", Electronics Letters, IEE Stevenage, GB, vol. 31, No. 3, Feb. 2, 1995, pp. 216-217.

Haelterman, et al., "Generation of Ultrahigh Repetition Rate Soliton Trains in Fibre Ring", Electronics Letters, IEE Stevenage, GB, vol. 29, No. 1, Jan. 7, 1993, pp. 119-121.

Arahira S. et al., "Transform-Limited Optical Short-Pulse Generation at High Repetition Rate Over 40 GHz from a Monolithic Passive Mode-Locked Laser Diode", IEEE Photonics Technology Letters, IEEE, New York, US, vol. 5, No. 12, Dec. 1993, pp. 1362-1365.

Taga H. et al., "Multi-Thousand Kilometer Optical Soliton Data Transmission Experiments at 5 GB/s Using an Electroabsorption Modulator Pulse Generator", Journal of Lightwave Technology, IEEE, New York, US, vol. 12, No. 2, Feb. 1994, pp. 231-235.

Atieh A. K. et al., "Towards All-Optical Ultra-High-Speed Transmission Systems", Electrical and Computer Engineering, 1995. Canadian Conference on Montreal, Que., Canada Sep. 5-8, 1995, New York, US, IEEE, US, vol. 1, Sep. 5, 1995, pp. 90-92.

Partial European Search Report for Application No. EP 04 01 9570, 2005.

* cited by examiner

DISPERSION MANAGEMENT SYSTEM FOR SOLITON OPTICAL TRANSMISSION SYSTEM

This is a continuation of PCT application No. PCT/GB96/02923, filed 27 Nov. 1996.

BACKGROUND

This invention relates to optical communications and, in particular, to optical communications systems in which information is transmitted by soliton or soliton-like pulses.

Laboratory demonstrations have recently been reported of soliton transmission in systems where the dispersion was not uniformly anomalous along the fibre, instead being periodically compensated by fibre of opposite (normal) sign dispersion. In this manner transmission was achieved at 20 Gb/s over 9000 km in a recirculating loop, and 8100 km in a straight line experiment. These figures are substantially in excess of what has previously been achieved without the use of soliton control techniques such as sliding filters and synchronous modulators. While it is thus clear that there are significant benefits to be gained from adopting dispersion management in soliton systems, to date there has been little conceptual explanation of the mechanisms behind this improvement.

BRIEF SUMMMARY OF THE INVENTION

The correct selection of dispersion is a critical issue in the design of amplified long haul optical communication systems. In the case of soliton formatted data, it is dictated by compromise between the desire to minimise timing jitter problems (implying low dispersion), and the need to maintain adequate energy per bit for successful detection. As the energy needed to form a soliton in a uniform fibre is proportional to the dispersion, the latter constraint places a lower limit on the permitted dispersion. Dispersion management is a technique in the context of non-return-to-zero (NRZ) formatted data in which fibres of opposite sign dispersions are concatenated together. This produces a high local dispersion at any given point, and yet a low path-average dispersion. We have found that, by adopting a suitable dispersion management scheme for soliton or soliton-like transmission, it is possible to increase the soliton energy substantially compared with the equivalent uniform fibre with equal path-average dispersion.

According to the present invention there is provided a dispersion management system for soliton or soliton-like transmission in which the duration of a dispersion compensation phase is short in comparison with the propagation interval in the remainder of the system.

Preferably the system excludes arrangements in which the dispersion map of one fibre is substantially closer to zero than that of its complementary fibre.

BRIEF DESCRIPTION OF THE DRAWINGS

The invention will be particularly described with reference to the accompanying drawings in which.

DETAILED DESCRIPTION

Figure 1:
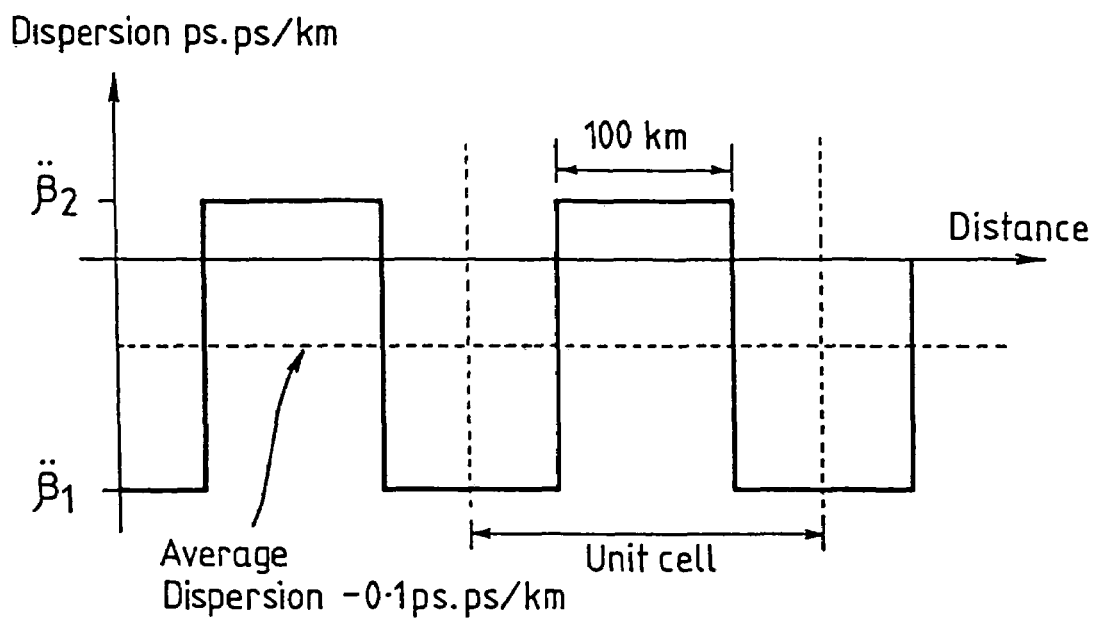
FIG. 1 is a dispersion compensation map.
Figure 5:
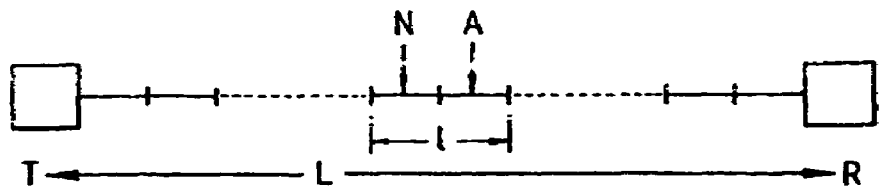
FIG. 5 is an outline diagram of a dispersion management system in accordance with one aspect of the invention.

Our work is based upon numerical integration of the Nonlinear Schrödinger Equation (NLS), using the dispersion map shown in FIG. 1. The arrangement of a typical system is shown in FIG. 5 and comprises a transmitter T and Receiver R lined by a length L of fibre. This fibre is divided into elements 1 comprising separate sections of fibre N with normal dispersion and fibre A with anomalous dispersion. In a specific embodiment these are of equal length, although the unit cell is defined to start and end at the mid point of one of the fibres. In the specific examples presented, each of the fibres will be 100 km long, and the path average dispersion −0.1 ps$^2$/kM. The nonlinear coefficient was taken to be 2.65 rad/W/km. To simplify the problem we have chosen to neglect loss and high order dispersion throughout.

Figure 2:
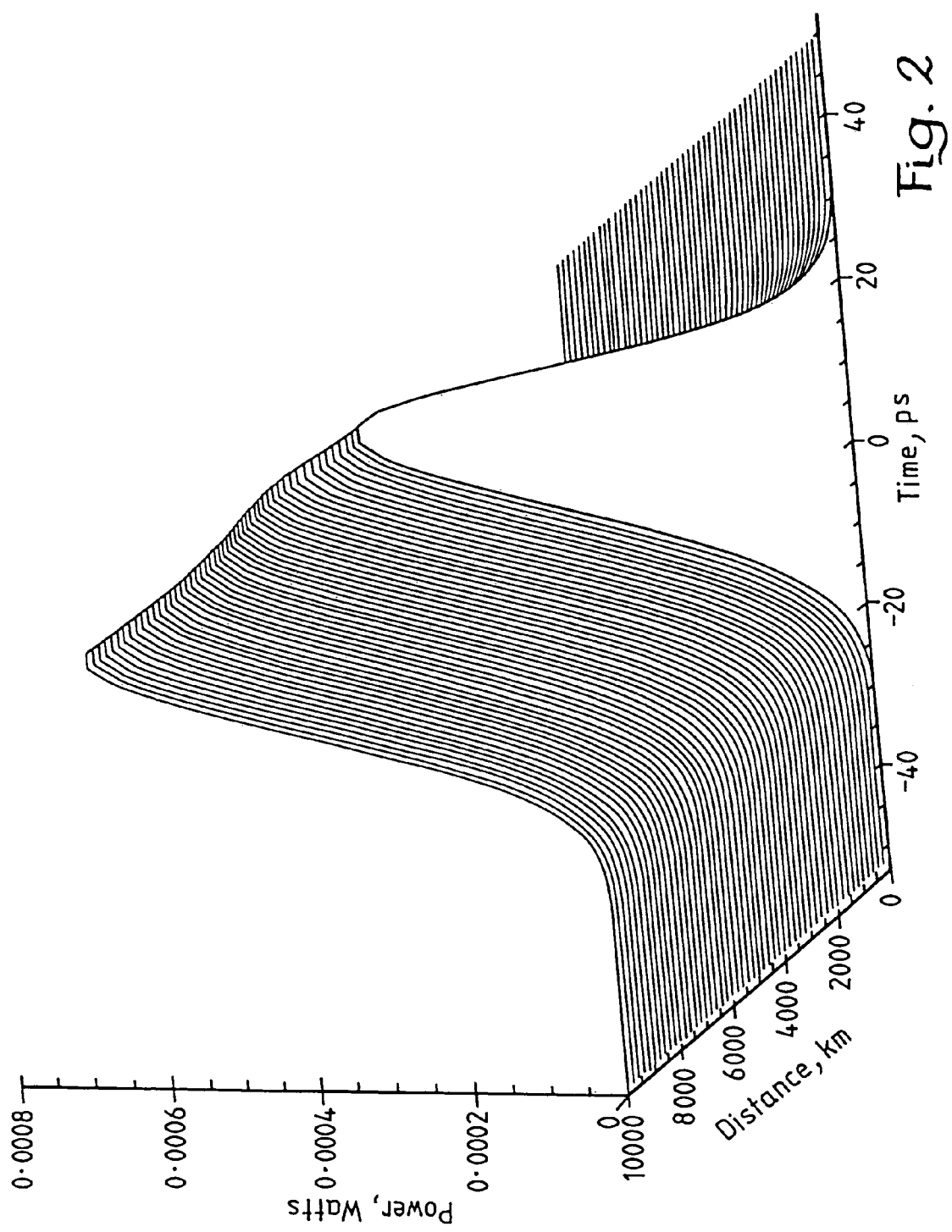
FIG. 2 shows the pulse profile at the beginning of each unit cell in a dispersion managed system. The dispersion map comprises alternating 100 km fibres with dispersions of −3 ps$^2$/km and +2.8 ps$^2$/km.
Figure 3:
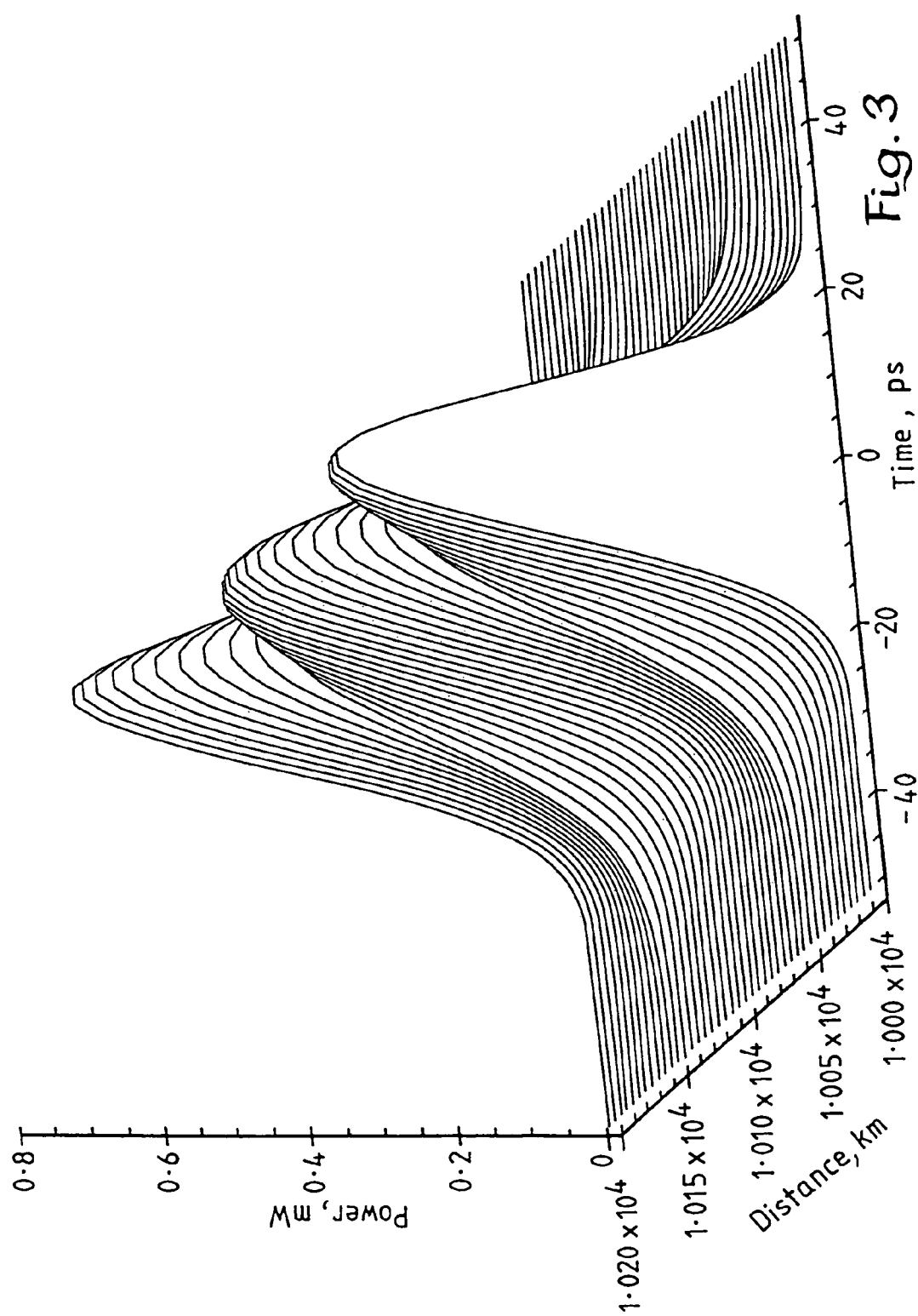
FIG. 3 shows the evolution of a over one period of the dispersion compensation cycle

We have confirmed the existence of quasi-stable soliton or solitary wave solutions to this dispersion map. FIGS. 2 and 3 show the observed behaviour when the dispersion values alternated between −3.0 ps$^2$/km and +2.8 pS$^2$/km, and a 20 ps FWHM Gaussian pulse of peak power 650 μW was launched into the fibre. FIG. 2 shows the intensity profiles at the start of each unit cell; it can be seen that the pulse profile at these points remains unchanged over successive cycles of the dispersion map. The evolution within one unit cell is shown in FIG. 3, the pulse alternately compressing and dispersing as the sign of the dispersion is switched. The power spectrum remains essentially unchanged within the unit cell.

There are three constraints which must be satisfied to obtain stable solutions to the periodic dispersion map. Firstly, the path average dispersion must be anomalous, in order that the Kerr induced spectral broadening can be compensated. Secondly, the period of the dispersion compensation cycle must be short compared to the nonlinear length of the system. For a 1000 Km fibre, the dispersion compensation length is preferably 100 Km or less. Finally, dispersion maps in which one of the fibres is much closer to zero dispersion than the other should be avoided. as otherwise energy is rapidly coupled out of the pulse into dispersive waves.

Figure 4:
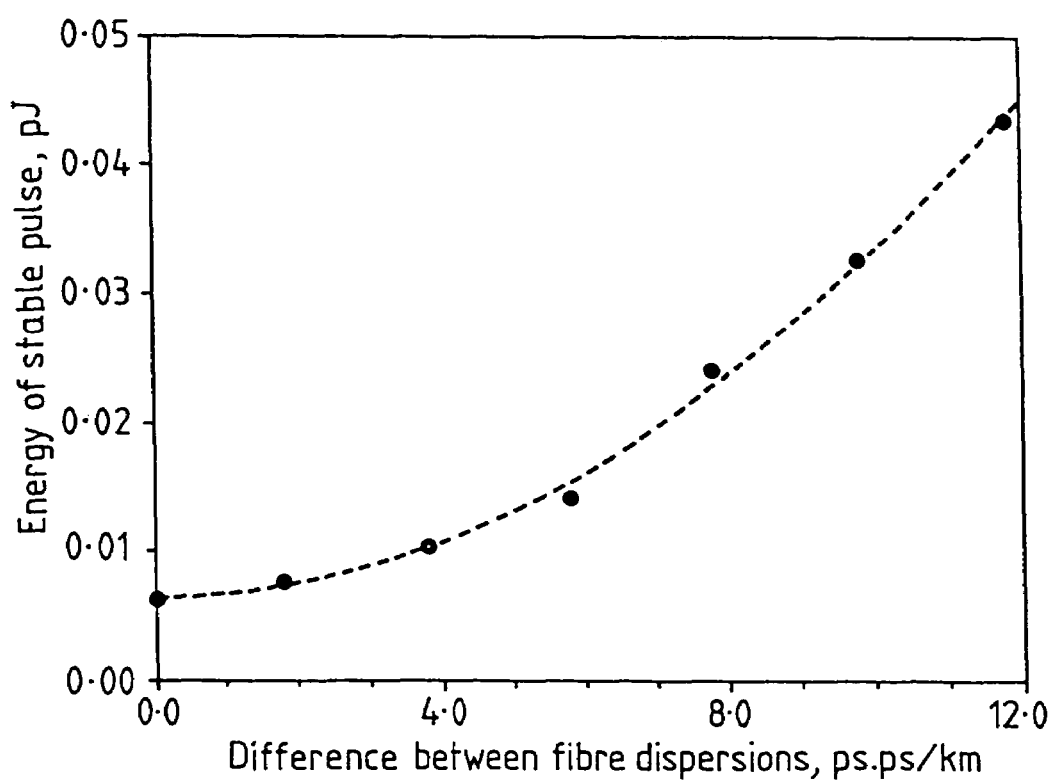
FIG. 4 shows the energy required to launch a 20 ps FWHM soliton in dispersion managed system with alternating 100 km length fibres chosen such that the path-average dispersion remains at −0.1 ps$^2$/km.

The advantages conferred by a dispersion management scheme on soliton communications stems from the fact that more energy is required to launch a stable pulse than in the equivalent uniform system with equal path average dispersion. This is demonstrated in FIG. 4, which plots the pulse energy of the stable solution as a function of the difference between the dispersion values of the two individual fibres. Preferably, the difference between fibre dispersions is less than 12.0 ps$^2$/Km and, ideally, less than 4.0 ps$^2$/Km. Under optimum conditions it will be 0.1 ps$^2$/Km or less. Greater differences between the two fibres results in more energy being required to form a stable pulse; we have also found that lengthening the unit cell's period (with a given pair of dispersion values) increases the required energy. The mechanism behind this increased energy requirement can be understood from the intensity profile within the unit cell, FIG. 3. Due to the cycle of dispersive broadening and compression, the peak power of the pulse is generally lower than the initial launch power. Therefore the rate of self phase modulation (SPM) is reduced compared to the equivalent uniform fibre, and so more energy is required to balance the path-average dispersion. In the frequency domain, the process could be construed as a reduction in the efficiency of four wave mixing. of which SPM is a special case.

Another highly novel feature of these solitary waves is that their pulse shapes are not the hyperbolic secants of regular optical fibre solitons. The example pulse profile which we have displayed is almost exactly Gaussian in nature, however this is only a special case for that particular dispersion map. As the dispersion variation is increased there is a transition from the uniform fibre hyperbolic secant soliton (time-bandwidth-product 0.32) to Gaussian (0.44) form, and then to pulse shapes with higher still time-bandwidth-products. An interesting connection can be made at this point with the "stretched pulse" design of mode-locked fibre laser. These incorporate cavities with two opposite signs of dispersion and also produce Gaussian shaped pulses.

In cases of soliton or soliton-like transmission in dispersion compensated fibres employing a configuration with zero path average dispersion, undistorted pulse propagation was obtained in this situation due to the presence of optical filters in the recirculating loop. The stable pulses then arose from balancing SPM against filtering, rather than SPM against the path-average dispersion.

CONCLUSION

Figure 6:
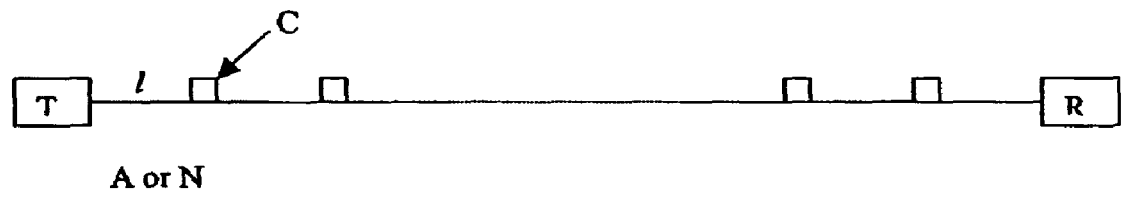
FIG. 6 is an outline diagram of a dispersion management system in accordance with one embodiment of the invention.

The technique of dispersion management has the potential to make a significant impact of the realisation of soliton communication systems. It provides major performance benefits, and has the distinct advantage of requiring only passive components. While, in a preferred embodiment, we have used equal lengths of two different fibres, alternative embodiments may use discrete dispersion compensators fabricated from highly dispersive materials as shown for example in FIG. 6. The adoption of dispersion management represents a convergence between the techniques used in soliton and NRZ formatted transmission.

The invention claimed is:

1. An optical communication system for transmitting a soliton or substantially soliton pulse, comprising
    a plurality of dispersion elements, each dispersion element from the plurality of dispersion elements including at least a fiber length and a discrete dispersion compensator, the fiber length and discrete compensator having different dispersions, wherein the path average dispersion of the plurality of dispersion elements is anomalous.

2. The optical communication system of claim 1, wherein the discrete dispersion compensator is fabricated from a highly dispersive material.

3. The optical communication system of claim 1, wherein at least one of the discrete dispersion compensators is fabricated from a highly dispersive material.

4. The optical communication system of claim 1, wherein the soliton or substantially soliton pulse has a time-bandwidth product greater than the time-bandwidth product of a Gaussian-shaped pulse.

5. The optical communication system of claim 1, wherein the soliton or substantially soliton pulse has a time-bandwidth product greater than the time-bandwidth product of a Gaussian-shaped pulse.

6. An optical communication system comprising
    a plurality of sections, each section including at least two dispersion elements that have dispersions of opposite sign, wherein the plurality of sections permits propagation of a stable or quasi-stable optical pulse, and wherein the optical pulse has a time-bandwidth product greater than a time-bandwidth product of an optical pulse that is Gaussian in shape.

7. The optical communication system of claim 6, wherein the optical pulse alternately expands and compresses as it propagates through the sections.

8. The optical communication system of claim 6, wherein the path average dispersion of the plurality of sections is zero or anomalous.

9. The optical communication system of claim 6, wherein the difference between the dispersion magnitudes of the two dispersion elements is less than 12 $ps^2/Km$.

10. The optical communication system of claim 9, wherein the difference between the dispersion magnitudes of the two dispersion elements is less than 4 $ps^2/Km$.

11. The optical communication system of claim 10, wherein the difference between the dispersion magnitudes of the two dispersion elements is less than 0.1 $ps^2/Km$.

12. The optical communication system of claim 6, wherein the two dispersion elements of a section comprise an optical fiber length and a discrete dispersion compensator.

13. A method of optical communication comprising:
    generating a plurality of optical pulses; and
    launching the plurality of optical pulses through an optical communication system comprising a plurality of dispersion elements, each dispersion element from the plurality of dispersion elements including at least a fiber length and a discrete dispersion compensator, the fiber length and the discrete dispersion compensator having different dispersions, wherein the path average dispersion of the plurality of dispersion elements is zero or anomalous, such that the optical pulses are transmitted as soliton or substantially soliton pulses.

14. A method of optical communication comprising:
    generating a plurality of optical pulses; and
    launching the plurality of optical pulses through an optical communication system comprising a plurality of sections, each section including at least two dispersion elements that have dispersions of opposite sign, wherein the plurality of sections permits propagation of corresponding stable or quasi-stable optical pulses, and wherein the stable or quasi-stable optical pulses have a time-bandwidth product greater than a time-bandwidth product of optical pulses that are Gaussian in shape.

* * * * *